United States Patent
Morgan et al.

(10) Patent No.: US 7,339,942 B2
(45) Date of Patent: Mar. 4, 2008

(54) DYNAMIC QUEUE ALLOCATION AND DE-ALLOCATION

(75) Inventors: David Lynn Morgan, Salt Lake City, UT (US); Stephen Clawson, Salt Lake City, UT (US); James Freeman, Salt Lake City, UT (US)

(73) Assignee: Alcatel Lucent, Paris (FR)

( * ) Notice: Subject to any disclaimer, the term of this patent is extended or adjusted under 35 U.S.C. 154(b) by 1049 days.

(21) Appl. No.: 10/264,786

(22) Filed: Oct. 4, 2002

(65) Prior Publication Data

US 2003/0076849 A1 Apr. 24, 2003

Related U.S. Application Data

(60) Provisional application No. 60/328,159, filed on Oct. 10, 2001.

(51) Int. Cl.
*H04L 12/28* (2006.01)
*H04J 3/16* (2006.01)

(52) U.S. Cl. .................... 370/412; 370/465
(58) Field of Classification Search .............. None
See application file for complete search history.

(56) References Cited

U.S. PATENT DOCUMENTS

| | | | |
|---|---|---|---|
| 4,953,157 A | 8/1990 | Franklin et al. | |
| 5,390,176 A | 2/1995 | Schoute et al. | |
| 5,521,923 A | 5/1996 | Willmann et al. | |
| 5,546,389 A | 8/1996 | Wippenbeck et al. | |
| 5,768,257 A | 6/1998 | Khacherian et al. | |
| 6,286,052 B1 | 9/2001 | McCloghrie et al. | |
| 6,449,251 B1 * | 9/2002 | Awadallah et al. | 370/229 |
| 6,678,248 B1 * | 1/2004 | Haddock et al. | 370/235 |
| 6,865,388 B2 * | 3/2005 | Walsh et al. | 455/428 |
| 6,970,921 B1 * | 11/2005 | Wang et al. | 709/220 |
| 7,006,472 B1 * | 2/2006 | Immonen et al. | 370/332 |
| 7,065,616 B2 * | 6/2006 | Gajjar et al. | 711/154 |
| 2004/0076161 A1 * | 4/2004 | Lavian et al. | 370/395.41 |
| 2006/0010265 A1 * | 1/2006 | Aiken et al. | 710/33 |

OTHER PUBLICATIONS

IP to ATM Class of Service Phase 1 Design Guide; May 2, 1999; 51 pp.
JUNOS™ Internet Software Configuration Guide Interfaces and Class of Service, Release 5.2; Juniper Networks, Inc., Sunnyvale, California; 2000; pp. 1-438.

(Continued)

*Primary Examiner*—Andrew Lee
(74) *Attorney, Agent, or Firm*—Craig A. Hoersten; Bobby D. Slaton

(57) ABSTRACT

A dynamic queue allocation and de-allocation mechanism for managing traffic flowing through a switching node. If a packet matches conditions of a particular QoS policy rule, a determination is made as to whether a queue associated with the matched QoS policy rule exists on an egress port that is to forward the packet. If such a queue does not exist, a determination is made as to whether enough resources are available for dynamically creating the queue according to the QoS action parameters of the matched QoS policy rule. If the new queue may not be created because of resource limitation, queues of lower priority existing on the port are reclaimed and their resources reassigned to the new queue.

7 Claims, 9 Drawing Sheets

OTHER PUBLICATIONS

Bernet, Y. et al.; *An Informal Management Model for Diffserv Routers*; Internet Engineering Task Force; Feb. 2001; 50 pp.

Bernet, Y.; *Requirements of Diff-serv Boundary Routers*; Differentiated Services; Jul. 1998; 16 pp.

Ferguson, Paul; *Simple Differential Services: IP TOS and Precedence, Delay Indication, and Drop Preference draft-ferguson-delay-drop-00.txt*; Internet Draft; Nov. 7, 1997; 10 pp.

Lin, Arthur Y.M. et al.; *Priority Queueing Strategies and Buffer Allocation Protocols for Traffic Control at an ATM Integrated Broadband Switching System*; IEEE Journal on Selected Areas in Communications; vol. 9, No. 9; Dec. 1991; pp. 1524-1536.

Blake, S. et al.; *An Architecture for Differentiated Services*; Network Working Group; Request for Comments: 2475; Dec. 1998; 32 pp.

Lin, Arthur Y.M. et al.; *Priority Queueing Strategies and Buffer Allocation Protocols for Traffic Control at an ATM Integrated Broadband Switching System*; IEEE Journal on Selected Areas in Communications; vol. 9, No. 9; Dec. 1991; pp. 1524-1536.

\* cited by examiner

| QUEUE ID | PRIORITY | MIN BANDWIDTH | STORED FLOW |
|---|---|---|---|
| 1 | 2 | 30 M | FLOW FOR RULE 1 |
| 2 | 2 | 20 M | FLOW FOR RULE 3 |

FIG. 5

| PORT ID | MAX PORT BANDWIDTH | MAX QUEUES | MAX DEFLT BANDWIDTH | MAX DEFLT QUEUES | STATUS | AVAIL BANDWIDTH | QoS |
|---|---|---|---|---|---|---|---|
| 1 | 100M | 2 | 80M | 1 | UP | 50M | ENABLED |

FIG. 7

|  | | ACTION | |
| RULE | CONDITION | PRIORITY | MIN BNDWTH | MAX BNDWTH |
| --- | --- | --- | --- | --- |
| 1 | COND1 | 1 | 80M | |
| 2 | COND2 | 2 | 30M | |
| 3 | COND3 | 2 | 40M | |
| 4 | COND4 | 3 | | 40M |
| 5 | COND5 | 5 | 80M | |

FIG. 9

DYNAMIC QUEUE ALLOCATION AND
DE-ALLOCATION

CROSS-REFERENCE OF RELATED
APPLICATION(S)

This application claims the benefit of U.S. provisional application No. 60/328,159, filed on Oct. 10, 2001, the contents of which are incorporated herein by reference.

FIELD OF THE INVENTION

This application relates generally to managing network resources in a network switching node, and more particularly, to dynamic allocation and de-allocation of queues in the node for managing data traffic.

BACKGROUND OF INVENTION

Packets received by a network switching node are generally stored in hardware or software queues prior to being forwarded to a destination. Each queue in the node is typically configured by a network administrator prior to its use. For example, the queue may be configured with various parameters available for the particular queue, with an interface type, and with information on the priority of data packets to be stored in the queue.

A drawback with the existing manner of configuring queues is that the process is manual and time consuming. In addition, the network administrator must generally know the specific parameters of the queue in advance before the configuration can occur. For example, the network administrator generally needs advance knowledge of the number of queues to be configured and the traffic that will flow through those queues. A further drawback with the existing configuration process is that statically assigned queues may not change in real-time to accommodate the dynamic nature of network traffic, resulting in inefficient use of network resources.

Accordingly, what is desired are queues whose queuing parameters are not statically configured prior to their use. Such queues should instead be dynamically created and configured based on varying flows in network traffic.

SUMMARY OF THE INVENTION

The present invention is directed to a dynamic queue allocation and de-allocation mechanism. According to one embodiment, the invention is directed to a switching node in a data communications network that includes an input receiving an inbound packet, a data store storing a plurality of policy rules, and a packet processor coupled to the input and the data store. The packet processor identifies a policy rule applicable to the packet and dynamically creates a queue in accordance with the identified policy rule.

According to another embodiment, the invention is directed to a switching node in a data communications network that includes an input and a packet processor. The input receives an inbound packet for forwarding on an output. The packet processor identifies a priority associated with the packet and dynamically creates at a destination associated with the output a queue for storing packets associated with the identified priority prior to forwarding the packet to the output.

According to a further embodiment, the invention is directed to a switching node in a data communications network that includes an input receiving an inbound packet, a data store storing a plurality of policy rules, and a packet processor coupled to the input and the data store. The packet processor identifies a policy rule applicable to the packet and determines if the identified policy rule indicates a quality of service parameter. If the policy rule indicates a quality of service parameter, the packet processor dynamically creates a queue according to the indicated quality of service parameter. The quality of service parameter may be, according to one embodiment, a quality of service priority.

In an additional embodiment, the packet processor monitors network resources and allocates the resources to the new queue based on their availability.

In yet another embodiment, the packet processor de-allocates resources allocated to an existing queue if the existing queue is associated with a priority that is lower than the priority indicated for the new queue. The de-allocated resources are then re-allocated to the new queue.

In another embodiment, the invention is directed to a method for managing network traffic in a data communications network. The method includes receiving an inbound packet, identifying a policy rule applicable to the packet, identifying an egress port for the packet, and determining if a destination associated with the egress port has a queue associated with the identified policy rule. If the destination does not have a queue associated with the identified policy rule, dynamically creating at the destination a queue in accordance with the identified policy rule.

It should be appreciated, therefore, that the dynamic queue allocation of a preferred embodiment avoids the need for pre-configuring and pre-allocating queues in a static manner. The dynamic queue allocation further allows the switching node to adjust to varying flows in network traffic and ensure that queues with the highest priority flows are provided with the necessary network resources prior to providing those resources to queues with lower priority flows.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 5 is a schematic layout diagram of an exemplary queue table maintained by the queue mapper of FIG. 4 according to one embodiment of the invention;

FIG. 7 is an exemplary port table maintained by the port manager of FIG. 6 according to one embodiment of the invention;

FIG. 9 illustrates an exemplary policy table including QoS policy rules for which queues may be dynamically created.

DETAILED DESCRIPTION

Figure 1:
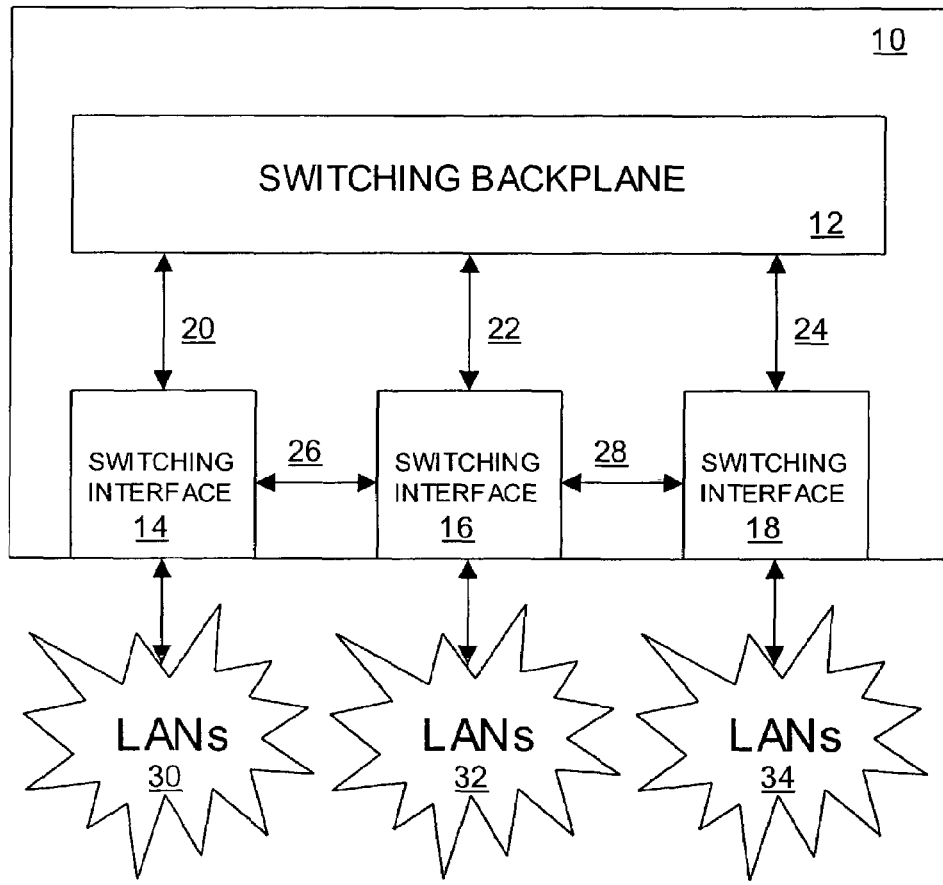
FIG. 1 is a schematic block diagram of a network environment including a packet switching node according to one embodiment of the invention.

FIG. 1 is a schematic block diagram of a network environment including a packet switching node 10 according to one embodiment of the invention. The packet switching node may also be referred to as a switch, a data communication node or a data communication switch. The packet switching node 10 includes switching interfaces (also referred to as ports) 14, 16 and 18 interconnected to respective groups of LANs 30, 32, 34, and to one another over data paths 20, 22, 24 via switching backplane 12. The switching backplane 12 preferably includes a switching fabric. The switching interfaces may also be coupled to one another over control paths 26 and 28.

The switching interfaces 14, 16, 18 forward packets to and from their respective groups of LANs 30, 32, 34 in accordance with one or more operative communication protocols, such as, for example, media access control (MAC) bridging and Internet Protocol (IP) routing. The switching node 10 is shown for illustrative purposes only. In practice, packet switching nodes may include more or less than three switching interfaces.

Figure 2:
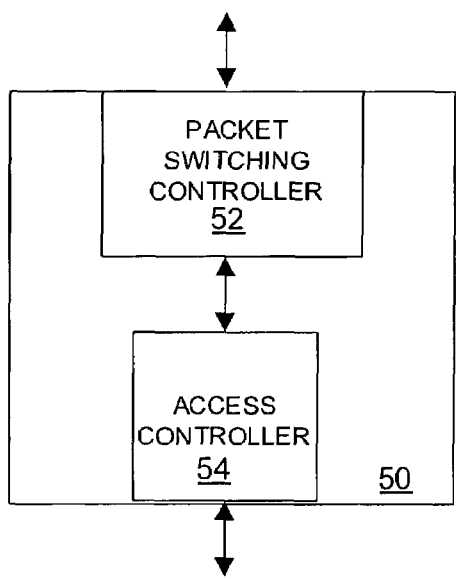
FIG. 2 is a schematic block diagram of the packet switching node of FIG. 1 according to one embodiment of the invention.

FIG. 2 is a block diagram of a switching interface 50 in one embodiment of the present invention. The switching interface 50 may be similar, for example, to the switching interfaces 14, 16, 18 of FIG. 1. The switching interface 50 includes an access controller 54 coupled between LANs and a packet switching controller 52. The access controller 54, which may, for example, include a media access controller (MAC), preferably receives inbound packets off LANs, performs flow-independent physical and MAC layer operations on the inbound packets and transmits the inbound packets to the packet switching controller 52 for flow-dependent processing. The access controller 54 also receives outbound packets from the packet switching controller 52 and transmits the packets on LANs. The access controller 54 may also perform physical and MAC layer operations on the outbound packets prior to transmitting them on LANs.

The packet switching controller 52 receives inbound packets, classifies the packets, modifies the packets in accordance with flow information, and transmits the modified packets on switching backplane, such as the switching backplane 12 of FIG. 1. The packet switching controller 52 preferably also receives packets modified by other packet switching controllers via the switching backplane and transmits them to the access controller 54 for forwarding on LANs. The packet switching controller 52 may also subject selected ones of the packets to egress processing prior to transmitting them to the access controller 54 for forwarding on LANs.

Figure 3:
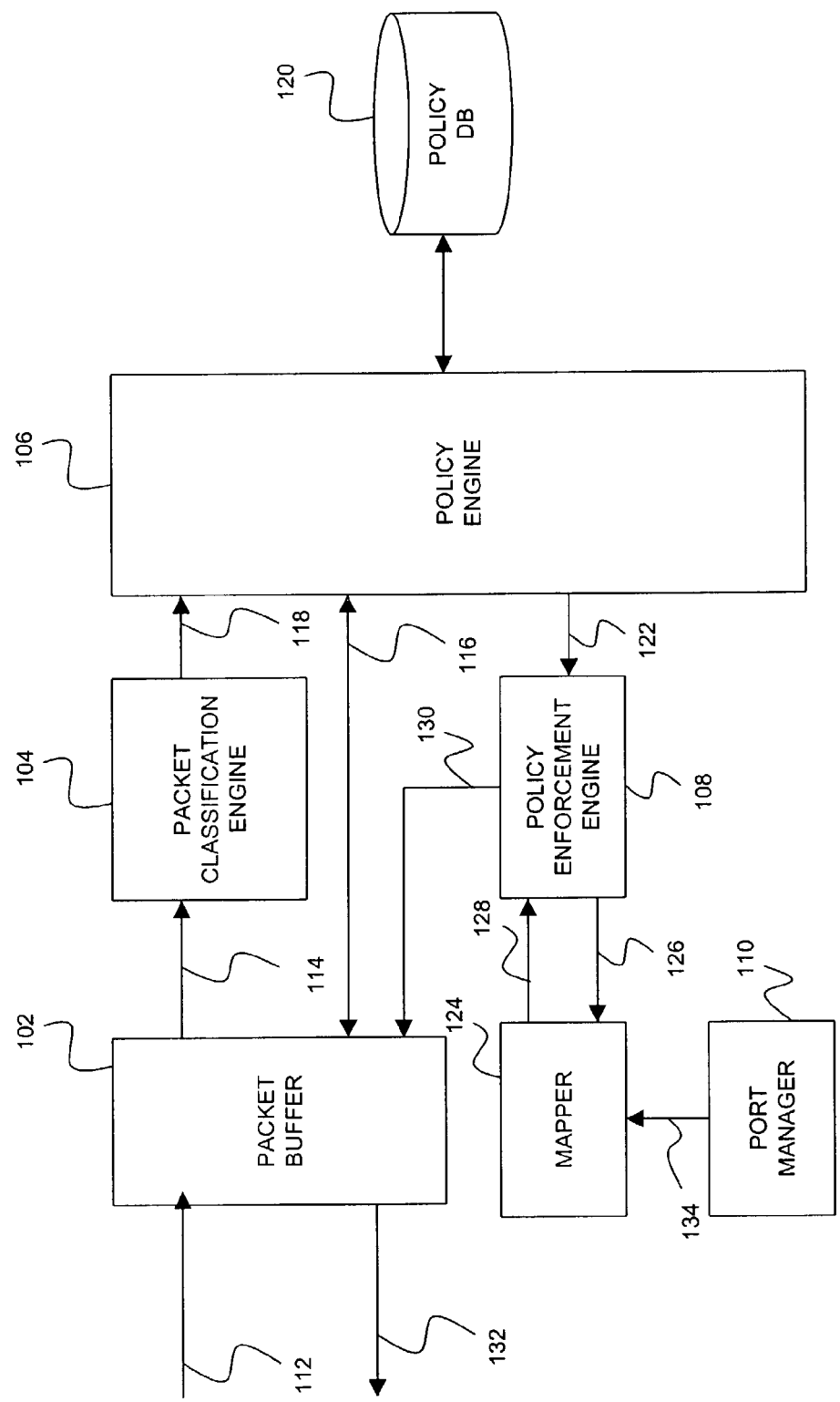
FIG. 3 is a more detailed schematic block diagram of a packet switching controller providing dynamic queue allocation and de-allocation according to one embodiment of the invention.

FIG. 3 is a more detailed schematic block diagram of the packet switching controller 52 of FIG. 2 according to one embodiment of the invention. The packet switching controller 52 receives inbound packets and dynamically allocates and de-allocates queues based on quality of service (QoS) parameters of matching QoS policy rules. The packet switching controller 52 may also be referred to as a packet processor.

The packet switching controller 52 may include a packet buffer 102, packet classification engine 104, policy engine 106, policy enforcement engine 108, queue mapper 124, port manager 110, and policy database 120. The packet classification engine 104, policy engine 106, policy enforcement engine 108, queue mapper 124, and port manager 110 are logical devices that may be implemented in software, hardware, firmware (e.g. ASIC), or any combination thereof. It is understood, of course, that FIG. 3 illustrates a block diagram of a packet switching controller without obfuscating inventive aspects of the present invention with additional elements and/or components that may be required for creating the controller. These additional elements and/or components, which are not shown in FIG. 3 are well known to those skilled in the art. It is also understood that although the packet classification engine 104, policy engine 106, policy enforcement engine 108, queue mapper 124, and port manager 110 are depicted in separate block form, any one or more of these components may be combined into a single component or further subdivided into additional components.

In general terms, the packet switching controller 52 receives inbound packets which may include, but are not limited to, Ethernet frames, ATM cells, TCP/IP and/or UDP/IP packets, and may also include other Layer 2 (Data Link/MAC Layer), Layer 3 (Network Layer) or Layer 4 (Transport Layer) data units.

The received packets are stored in the packet buffer 102. The packet buffer 102 provides the stored packets or portions thereof to the packet classification engine 104 for processing. The packet buffer 102 may include one or more of a data extractor and a data cache. The data extractor may be used to extract one or more fields from the packets, and store the extracted fields in the data cache as extracted data. The extracted data may include, but is not limited to, some or all of the packet header. In an Ethernet system, for example, the header data cache may also store first N bytes of each frame.

The extracted data is provided in an output signal 114 to the packet classification engine 104 for processing. The policy engine 106 may also request and receive the extracted data over an interface 116. The extracted data may include, but is not limited to, one or more of Layer 2 MAC addresses, 802.1P/Q tag status, Layer 2 encapsulation type, Layer 3 protocol type, Layer 3 addresses, ToS (type of service) values, Layer 4 port numbers, portions of the packet body, and/or any other data used for determining a policy. In other embodiments, output signal 114 may include the whole inbound packet, instead of or in addition to the extracted data.

The packet classification engine 104 receives the extracted data and classifies the packet based on the extracted data. In essence, the packet classification engine 104 selects traffic flows to be processed based on the policies in the policy database 120.

The classification information is transmitted to the policy engine 106 via an output signal 118. The policy engine 106 accesses the policy database 120 and selects a policy applicable to the packet. The policy database 120 may be implemented in a local memory and/or in an external LDAP database. The policy database 120 includes a list of policies that are based on the contents of a packet and/or other elements such as, for example, time information, port information, and the like. Policies are rules composed of one or more conditions that describe a packet and one or more actions that define how the packet is to be processed if the condition is satisfied.

The policy engine 106 compares the extracted packet data with the policies in the policy database 120. If a match is found between the condition(s) in the policy and the extracted data, the policy engine determines the action(s) to be taken on the packet. The action(s) to be taken on the packet are transmitted to the policy enforcement engine 108 via an output signal 122.

The policy enforcement engine 108 ensures that the packet is processed according to the parameters defined in the action(s) received. According to one embodiment of the invention, if the policy rule applicable to the packet is a QoS policy rule, the policy enforcement engine 108 transmits a queue request 126 to the queue mapper 124 for a queue matching the QoS parameters of the QoS policy rule for storing the packet prior to being forwarded.

The queue mapper 124 receives the queue request and identifies or dynamically creates at a destination associated with an output where the packet is to be forwarded, a queue for storing the packet. The destination may be a single physical egress port or multiple physical egress ports treated as a single logical port for sharing common egress queues. Hereinafter, references to a port shall be deemed to mean either a physical port or a logical port with multiple physical ports.

If a new queue may not be created because of limits in the global and/or local resources, the mapper 124 may de-allocate queues of a lower priority already created on the destination to free the resources and assign the newly freed resources to the new queue. According to one embodiment of the invention, a determination of which queue is of a lower priority is done based on a strict queueing/flow priority. A person skilled in the art should recognize, however, that the determination may be made based on any precedence/priority mapping. For example, higher precedence policies may take priority over lower precedence policies when it comes to queue allocation.

According to one embodiment of the invention, the queue mapper 124 informs the policy enforcement engine 108 whether the queue was successfully identified or created via output signal 126. Upon an indication of success, the policy enforcement engine 108 transmits a command to the packet buffer 102 via output signal 130 to forward the packet as an outbound packet 132 to the queue.

The port manager 110 manages port bandwidth resources and tracks the status of the ports as either up or down. The queue mapper allocates or releases the queues on a particular destination based on the port information 134 provided by the port manager.

Figure 4:
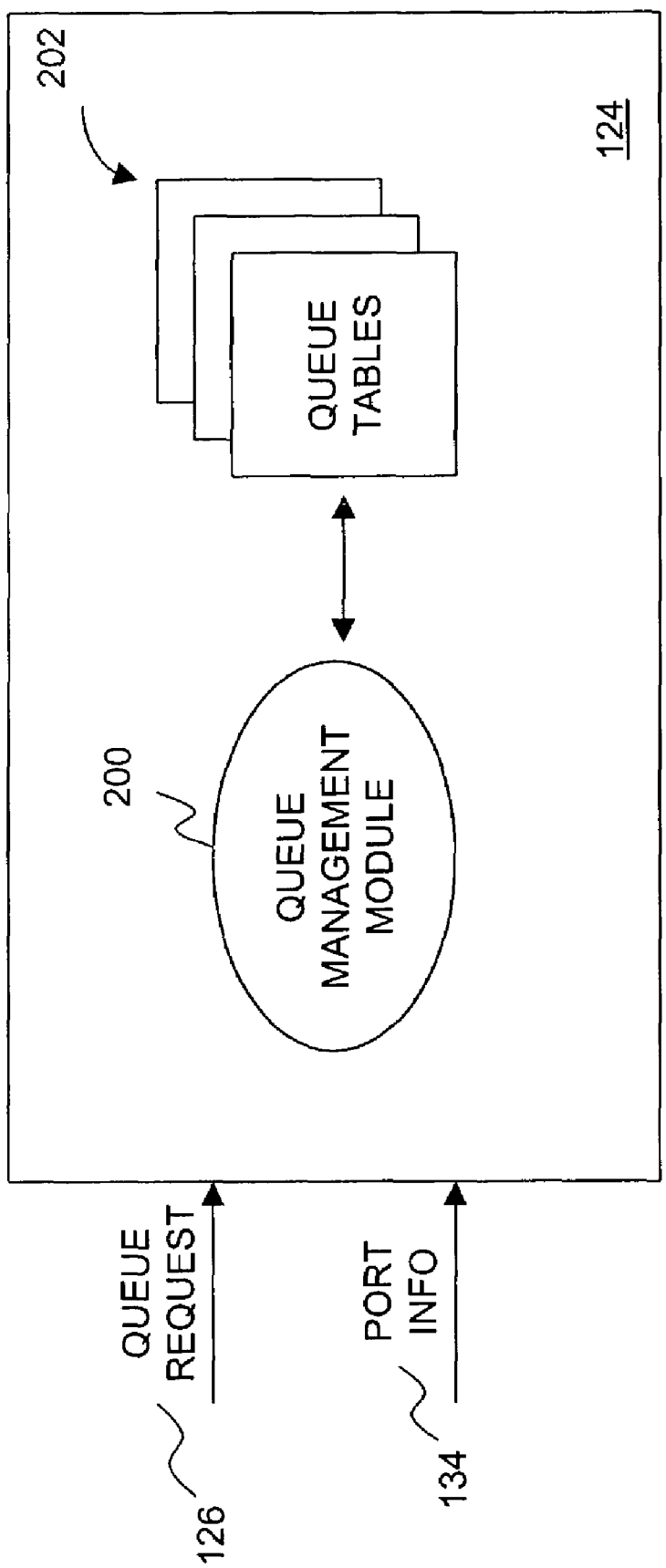
FIG. 4 is a block diagram of a queue mapper according to one embodiment of the invention.

According to one embodiment of the invention, the mapper 124 and port manager 110 are located in a single switching interface 14, 16, or 18 designated as a control switching interface. From this central location, the port manager 110 may manage resource and port status information and the mapper 124 may dynamically allocate and de-allocate the resources to the various queues FIG. 4 is a more detailed block diagram of the queue mapper 124 according to one embodiment of the invention. In the illustrated embodiment, the mapper includes a queue management module 200 in communication with one or more queue tables 202. A separate queue table may be maintained for each port of the switching node if the mapper is a centralized mapper managing multiple ports.

The queue management module 200 receives queue requests 126 from the policy enforcement engine 108 and port information 134 from the port manager 110, and dynamically creates and/or releases queues based on the received information. Updates are made to the queue tables 202 as queues are created and/or released.

According to one embodiment of the invention, the queue management module 200 attempts to create a queue for a QoS rule if the QoS rule is applicable to an inbound data packet. Future data packets that match the QoS rule are then placed in the same queue. In certain scenarios, multiple queues may be created for a match of a single QoS rule if traffic matching the QoS rule may flow out of different egress ports.

For example, if a QoS rule only specifies a source IP address, packets initiated from the source IP address but flowing to different destination IP addresses may match the rule. In this scenario, the queue management module 200 attempts to create a queue on each port that the packet matching the rule egresses. According to one embodiment of the invention, the queues are created on an as-needed basis as a flow egresses on a particular port.

In another embodiment of the invention, two or more QoS rules having a same policy action may share a single queue. The fact that a queue is shared may be indicated by setting a "shared" field in the QoS rules that share the queue.

In attempting to create a new queue on a particular egress port, the queue management module 200 determines whether enough resources are available to the port based on the port information obtained from the port manager 110. If a queue cannot be created because of resource limitation, such as for example, limits on the reserved bandwidth and/or the number of queues that may be created for a particular egress port, the queue management module 200 attempts to de-allocate queues of lower priority created on the port. If enough resources are available from the lower priority queues, the queue management module reclaims the resources used by the lower priority queues and uses them to create the new higher priority queue. Any traffic in the reclaimed queues are moved to an appropriate default queue for the port.

In addition to queue resources, the queue management module 200 determines the status of a port in attempting to create a new queue. The status of the port may be based on the port information 206 provided by the port manager 110. If the egress port in which the new queue is to be created does not support QoS, is disabled, or has QoS disabled, the queue is not created.

The queue management module 200 may further release an existing queue if its port becomes disabled, when a packet stored in the queue times out, or the queue does not store any packets. The queue management module 200 receives notification of a disabled port as part of the port information 134 transmitted by the port manager 110. If an existing queue is to be freed, the resources assigned to the queue is reclaimed and its entry deleted from the queue table.

FIG. 5 is a schematic layout diagram of an exemplary queue table 202 for a particular port on the switching node according to one embodiment of the invention. The queue table 202 includes various fields including but not limited to a queue ID field 202*a*, priority field 202*b*, minimum bandwidth field 202*c*, and associated flow field 202*d*.

The queue ID field 202*a* identifies the queues that have been created on the port. The queues may be implemented in either hardware or software. The priority field 202*b* indicates a priority associated with each queue on the port. The priority information reflects the QoS priority indicated in the QoS policy rule for which the queue was created. The minimum bandwidth field 202*c* indicates a bandwidth reserved for the queue by the port. The minimum bandwidth information may be obtained from the QoS policy rule associated with the queue. The stored flow field 202d identifies the flows being stored in the queue. The flows may be assigned a particular flow ID, and be associated with conditions of the QoS policy rule matching the particular flow.

Figure 6:
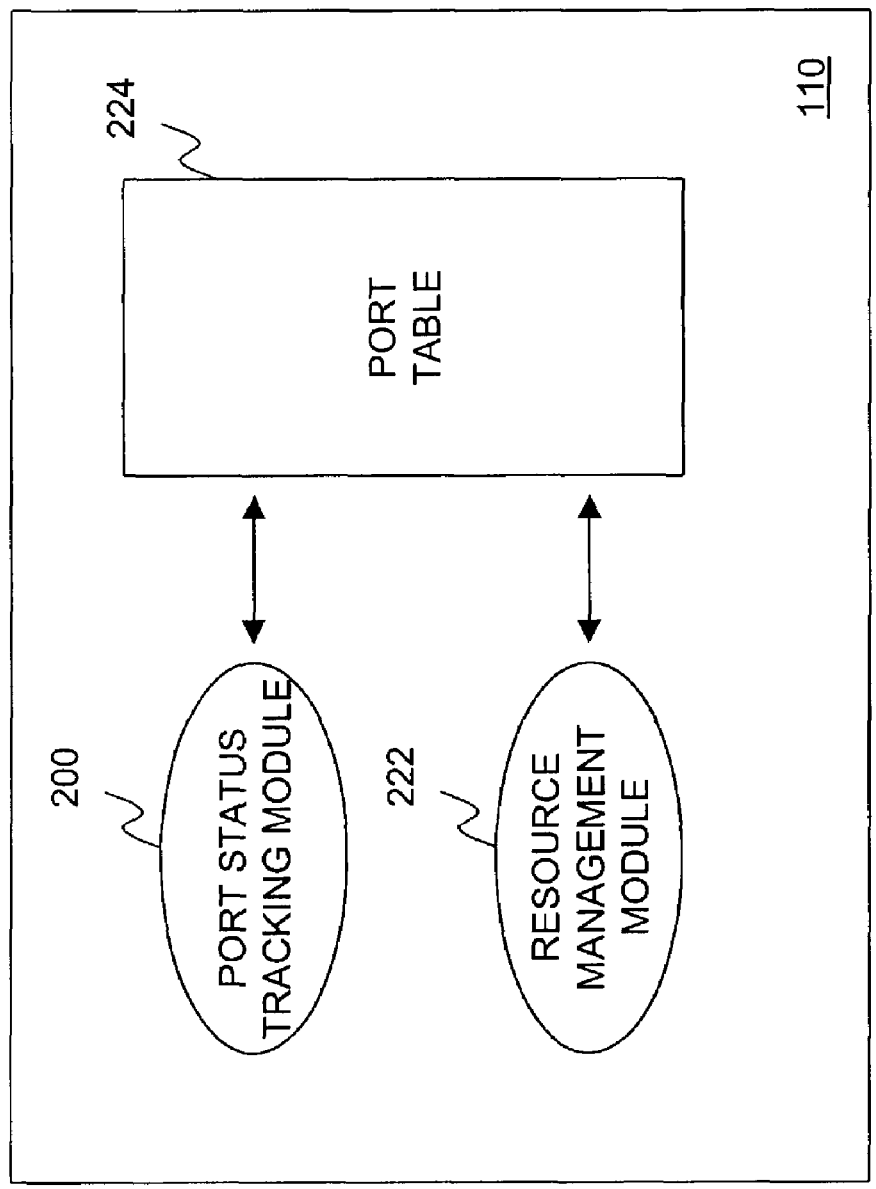
FIG. 6 is a more detailed block diagram of the port manager according to one embodiment of the invention.

FIG. 6 is a more detailed block diagram of the port manager 110 according to one embodiment of the invention. In the illustrated embodiment, the port manager includes a port status tracking module 220, bandwidth management module 222, and port table 224.

The port status tracking module 220 monitors the status of one or more ports according to conventional mechanisms. For example, the port status tracking module monitors the addition or deletion of physical or virtual ports, their condition as either up or down, and their QoS settings. The resource management module 222 tracks the available resources reserved for each port as queues are created and released. The resource management module 222 may also track global resources available to the entire switching node. One of the resources tracked for a particular queue is the reserved bandwidth. Updates are made the port table 224 based on the information provided by the port status tracking module 220 and the resource management module 222.

FIG. 7 is an exemplary port table 224 according to one embodiment of the invention. The port table may include a plurality of fields including a port ID 224a, maximum port bandwidth 224b, maximum queues 224c, maximum default bandwidth 224d, maximum default queries 224e, port status 224f, QoS 224g, and available bandwidth 224h. The maximum port bandwidth 224b field indicates a maximum bandwidth that may be reserved for the port for creating non-default queues. The maximum queues 224c field indicates a total number of non-default queues that may be dynamically created for the port. The maximum default bandwidth 224d indicates a maximum bandwidth that may be reserved for default queues. The maximum default queues 224e field indicates a total number of default queues that may be created for the port. A status field 224f indicates the status of the port as either up or down. The QoS field 224g indicates whether a port has its QoS enabled or disabled. The available bandwidth 224 field tracks the port's available bandwidth for dynamically creating queues for the port. According to one embodiment of the invention, all or a portion of the information stored in the port table 224 is provided to the queue management module 200 as the port information 134.

Figure 8:
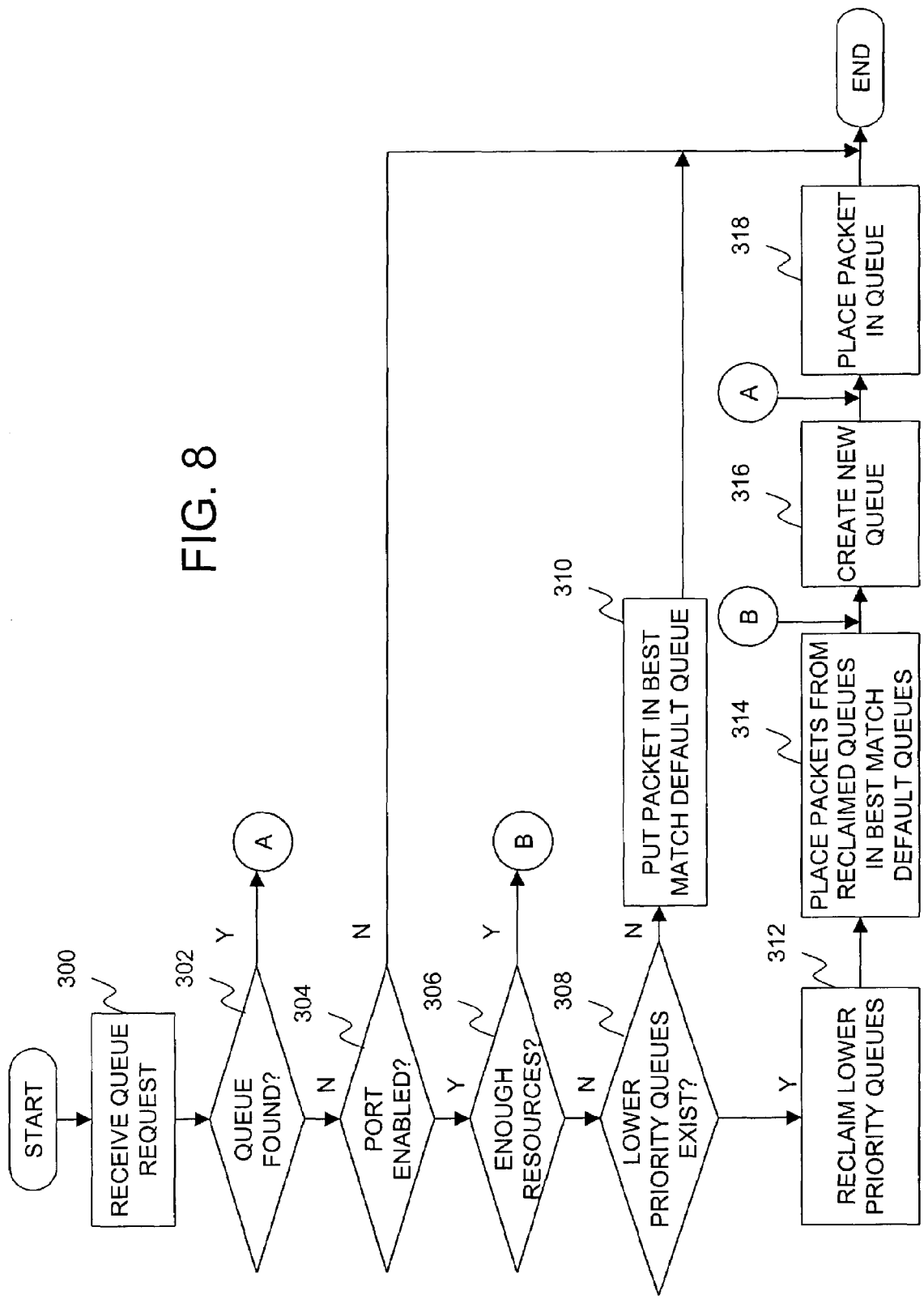
FIG. 8 is a flow diagram of a process for dynamic queue allocation and de-allocation according to one embodiment of the invention.

FIG. 8 is a flow diagram of a process for dynamic queue allocation and de-allocation according to one embodiment of the invention. The process begins and in step 300, the queue mapper 124 receives a queue request 126 from the policy enforcement engine 108 for storing an inbound packet. The queue request may include a port ID of the egress port for which the queue is desired, and a bandwidth for the queue. The mapper 124 may also receive, as part of the queue request or as a separate information transmittal, a rule ID of the matched QoS policy rule. The mapper may also receive queue requests due to protocols such as RSVP, or other well known traffic engineering protocols.

The mapper invokes the queue management module 200 for determining whether the queue tables 202 indicate that a queue has been created on the identified port for the matched QoS policy rule. In step 302, a determination is made as to whether such a queue was found. If the answer is YES, the inbound packet is stored in the identified queue in step 318.

If the answer is NO, a determination is made in step 304 as to whether the port is enabled for creating a queue on the port. In this regard, the queue management module determines based on the port information 134 transmitted by the port manager whether the port is up or down, and whether the port has its QoS enabled or disabled. If the port is up and has its QoS enabled, a queue may be created on the port if enough resources are available.

In step 306, the queue management module 200 determines the resources available to the port. In this regard, the queue management module 200 compares the bandwidth needed for creating the new queue with the available bandwidth 224 information in the port table 224 and determines whether sufficient bandwidth exists. The queue management module 200 also determines if a new queue may be created based on the maximum number of queues allotted to the port and/or other global and local resource constraints.

If enough resources are available to the port, the queue management module creates, in step 316, the new queue on the port, and in step 318, places the packet in the queue. A new entry is placed in the queue table 202 for the port to reflect the new queue, and the available bandwidth 224 information in the port table 224 is updated to take into account the resources taken by the new queue.

If enough resources are not available to the port for creating the new queue, a determination is made in step 308 as to whether lower priority queues exist that are currently using the needed resources. If the answer is YES, the lower priority queues and the resources occupied by these queues are reclaimed by the queue management module in step 312. In step 314, any packets stored in the reclaimed queues are transferred to one or more best matching default queues. The default queues may be either statically or dynamically generated and configured. If a default queue with a same priority as the reclaimed queue exists, the packets from reclaimed queue is transferred to such default queue. Otherwise, a default queue with a closest priority is selected as the recipient for the transferred packets.

In step 316 the new queue is created and the reclaimed resources re-allocated to the new queue. In step 318, the packets are placed in the newly created queue.

FIG. 9 illustrates an exemplary policy table 400 including QoS policy rules for which queues may be dynamically created. The QoS policy rules according to the illustrated embodiment include a rule identifier 402, one or more conditions 404, and one or more QoS action parameters 406. The conditions 404 may include, but are not limited to source addresses, destination addresses, VLAN identifiers, port numbers, and/or interface types. The QoS action parameters 406 may include, but are not limited to a QoS priority 408, minimum bandwidth 410, and maximum bandwidth 412. Upon a match of the identified conditions with a packet, a queue is generated and/or identified based on the associated QoS action parameters.

Figure 10:
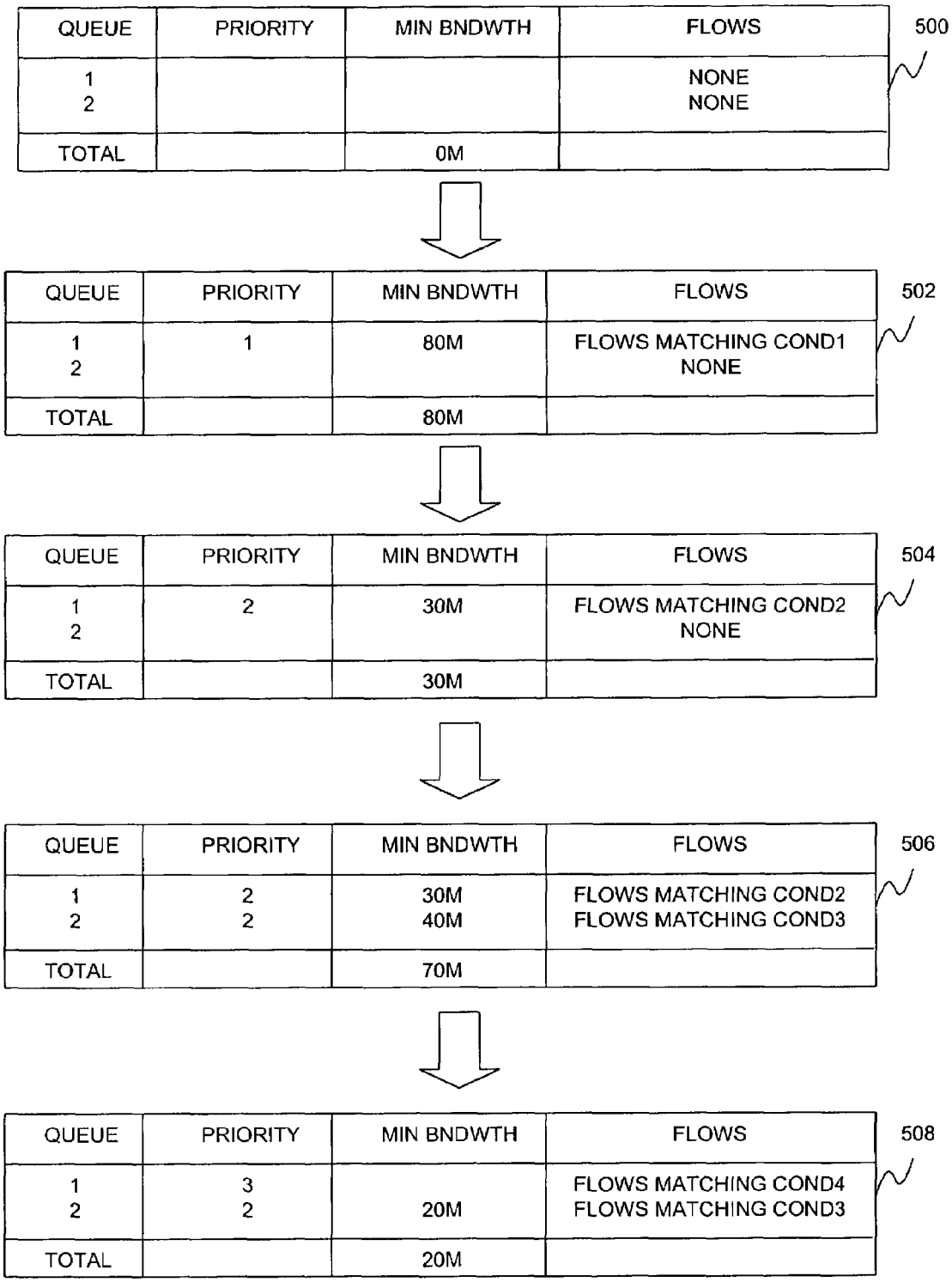
FIG. 10 illustrates changes in an exemplary queue table as queues are created and reclaimed according to one embodiment of the invention.

FIG. 10 illustrates changes in an exemplary queue table as queues are created and reclaimed for a particular port based on changes in traffic flowing through the port. For purposes of this example, it is assumed that the maximum bandwidth assigned to the port is 100M, and the maximum number of queues is two. It is also assumed that the node adheres to the QoS policies illustrated in FIG. 9.

Table 500 illustrates an initial queue table for the port. Upon initialization, the port contains no queues, and all of the port's bandwidth is available for allocating to a newly generated queue. The port receives a first traffic flow matching Cond1 of the policy rules in the policy table 400. Cond1 requires a queue with a QoS priority of "1" and a minimum bandwidth of 80M. The minimum bandwidth is available to the port, and the queue is created based on the QoS parameters associated with Cond1, leaving an available bandwidth of 20M to the port. The queue table is also updated as reflected in Table 502.

The port next receives a second traffic flow matching Cond2 of the policy rules. No queues matching Cond2 exist on the port, and a determination is made as to whether a new queue may be created based on available resources. Because the minimum bandwidth required for the new queue is 30M, which is more than the currently available bandwidth, the queue management module 200 reclaims the lower priority Queue 1 to obtain the necessary minimum bandwidth, and reassigns the reclaimed bandwidth to the new queue. The contents of the reclaimed Queue 1 are then transferred to a best matching default queue. The queue table is further updated as reflected in Table 504.

The port then receives a third traffic flow matching Cond3 of the policy rules. No queues matching Cond3 exist on the port, and a determination is made as to whether a new queue may be created based on available resources. Because the available bandwidth is 70M, the new queue is created based on the QoS parameters associated with Cond3, leaving an available bandwidth of 30M. The queue table is then updated as reflected in Table 506.

The port then receives a fourth traffic flow matching Cond4 of the policy rules. No queues matching Cond4 exist on the port, and a determination is made as to whether a new queue may be created based on available resources. The QoS action parameters for Cond4 do not indicate a minimum bandwidth to be reserved for the queue but only a maximum bandwidth that may be allowed for the queue. Thus, no minimum bandwidth constraints are imposed in creating the new queue. However, two queues have already been created for the port satisfying the maximum number of queues allowed for the port. In this scenario, the queue management module 200 reclaims one of the previously created queues, both having a lower priority than the priority of the new queue to be created, and the reclaimed resources are allocated for creating the new queue. The updated queue table is illustrated in Table 508.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

The inventions claimed is:

1. In a data communications network including a switching node, a method for managing network traffic comprising:
   receiving an inbound packet;
   identifying a policy rule applicable to the packet;
   identifying an egress port for the packet;
   determining if a destination associated with the egress port has a queue associated with the identified policy rule; and
   if the destination does not have a queue associated with the identified policy rule, dynamically creating at the destination a queue in accordance with the identified policy rule.

2. The method of claim 1, wherein the identified policy rule includes a quality of service parameter.

3. The method of claim 1 further comprising:
   monitoring network resources; and
   allocating the resources to the new queue based on availability of the network resources.

4. The method of claim 3 further comprising de-allocating resources allocated to an existing queue.

5. The method of claim 4 further comprising re-allocating at least a portion of the de-allocated resources to the new queue.

6. The method of claim 5, wherein the resources are de-allocated if the existing queue is associated with a priority that is lower than a priority indicated by the quality of service parameter.

7. The method of claim 5 further comprising transferring contents of the existing queue to a default queue.

* * * * *